United States Patent
Cervenka et al.

(10) Patent No.: US 9,055,754 B2
(45) Date of Patent: Jun. 16, 2015

(54) CHEWING GUM MANUFACTURE

(75) Inventors: Martin R. Cervenka, Chicago, IL (US);
Dennis W. Rybolt, Beecher, IL (US);
Scott G. Brown, Oswego, IL (US);
Mariano V. Artiaga, Barrington, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 580 days.

(21) Appl. No.: 12/988,278

(22) PCT Filed: Apr. 17, 2009

(86) PCT No.: PCT/US2009/002406
§ 371 (c)(1),
(2), (4) Date: Nov. 19, 2010

(87) PCT Pub. No.: WO2009/151506
PCT Pub. Date: Dec. 17, 2009

(65) Prior Publication Data
US 2011/0052756 A1    Mar. 3, 2011

Related U.S. Application Data

(60) Provisional application No. 61/046,249, filed on Apr. 18, 2008.

(51) Int. Cl.
*A23G 4/18* (2006.01)
*A23G 4/04* (2006.01)
*A23G 4/02* (2006.01)
*A23G 7/00* (2006.01)

(52) U.S. Cl.
CPC .. *A23G 4/02* (2013.01); *A23G 4/04* (2013.01); *A23G 7/0093* (2013.01)

(58) Field of Classification Search
CPC .......... A23G 4/02; A23G 4/04; A23G 7/0093
USPC ...................... 426/5, 517; 100/103
See application file for complete search history.

(56) References Cited

U.S. PATENT DOCUMENTS

| 4,555,407 | A |   | 11/1985 | Kramer |
| 5,229,148 | A | * | 7/1993  | Copper ........................ 426/5 |
| 5,667,824 | A | * | 9/1997  | Ream et al. ................. 426/5 |
| 6,551,643 | B2 | * | 4/2003 | Bernatz et al. ............ 426/516 |

FOREIGN PATENT DOCUMENTS

| EP | 1155621 B1 | 11/2001 |
| WO | 93/11674   | 6/1993  |

OTHER PUBLICATIONS

International Search Report and Written Opinion regarding PCT/US2009/002406, dated Oct. 19, 2010.
MoldMaking Technology, "Lower Deposition Temperature PVD Coatings Allow for Greater Choice in Mold Materials," Jan. 1, 2008 (available at http://www.moldmakingtechnology.com/articles/lower-deposition-temperature-pvd-coatings-allow-for-greater-choice-in-mold-materials).

* cited by examiner

*Primary Examiner* — Michele L Jacobson
*Assistant Examiner* — Bhaskar Mukhopadhyay
(74) *Attorney, Agent, or Firm* — Armstrong Teasdale LLP

(57) ABSTRACT

A chewing gum sheet is formed without substantial use of a powdered non-stick agent by extruding a slab having a tacky surface of heated chewing gum composition onto a moving conveyor; cooling the slab on the conveyor sufficiently to cool the surface of the slab; and passing the slab from the conveyor through at least one cooled roller to form a chewing gum sheet with predetermined dimensions.

28 Claims, 7 Drawing Sheets

CHEWING GUM MANUFACTURE

CROSS-REFERENCE TO RELATED APPLICATIONS

This application is a 35 U.S.C. §371 national stage application of PCT/US2009/002406, filed Apr. 17, 2009, and additionally claims benefit to U.S. Provisional Application No. 61/046,249, filed Apr. 18, 2008, incorporated herein by reference.

BACKGROUND OF THE INVENTION

This invention relates to manufacture of a confectionery material having a tacky surface such as chewing gum and more particularly relates to a process and apparatus for manufacture of chewing gum without substantial use of a rolling compound or powdered non-stick agent.

Chewing gum, commercially distributed as pieces such as sticks, tabs or pillows and which may be coated or filled, typically is produced by combining chewing gum components including a gum base, flavors, sweeteners, fillers, and binders; extruding such combined components into a slab of typically tacky gum composition material; rolling such slab into a uniform flat sheet of a desired thickness and width; scoring the uniform flat sheet into individual pieces; and ultimately packaging the resulting pieces. During processing, the extruded slab of chewing gum material must pass through a series of calender and scoring rollers to produce the ultimate product. In a conventional process, a rolling compound or powdered non-stick agent must be applied to the sheet during processing to avoid sticking or fouling of the rollers by a tacky gum material.

Use of extensive amounts of a rolling compound or powdered non-stick agent may cause manufacturing difficulties in controlling powdered material in the atmosphere, adds to manufacturing cost, creates difficulties in handling, increases processing time, may increase volatization of flavors and may create a porous non-uniform outer surface. A process which could substantially reduce or eliminate the need to use a rolling compound or powdered non-stick agent in a gum manufacturing process would be an improvement in the art.

SUMMARY OF THE INVENTION

A chewing gum sheet is formed without substantial use of a powdered non-stick agent by extruding a slab having a tacky surface of heated chewing gum composition onto a moving conveyor; cooling the slab on the conveyor sufficiently to cool the surface of the slab; and passing the slab from the conveyor through at least one cooled roller to form a chewing gum sheet with predetermined dimensions.

According to one aspect of the present invention, a process for manufacturing a chewing gum sheet without substantial use of a powdered non-stick agent is provided. The method includes extruding a slab having a tacky surface of heated chewing gum composition and passing the slab through at least one cooled roller to form a chewing gum sheet with predetermined dimensions.

In accordance with another aspect of the invention, an apparatus for producing a chewing gum sheet is provided. The apparatus includes an extruder for extruding the chewing gum mass into a slab having a tacky surface of heated chewing gum, a conveyor for receiving the chewing gum slab, an impingement air flow system for cooling the chewing gum slab upon the conveyor and at least one cooled roller for receiving the chewing gum slab from the conveyor and forming the chewing gum sheet with predetermined dimensions.

In accordance with still another aspect of the present invention, a system for producing chewing gum pieces is provided. The system includes a mixer for producing a chewing gum mass, an extruder for extruding the chewing gum mass into a slab having a tacky surface, a cooled forming and scoring unit for manipulating the slab into a chewing gum sheet with lateral and/or longitudinal scores and a cooled conveying system for receiving the chewing gum sheet and cooling the surface of the chewing gum.

DESCRIPTION OF THE INVENTION

Figure 1:
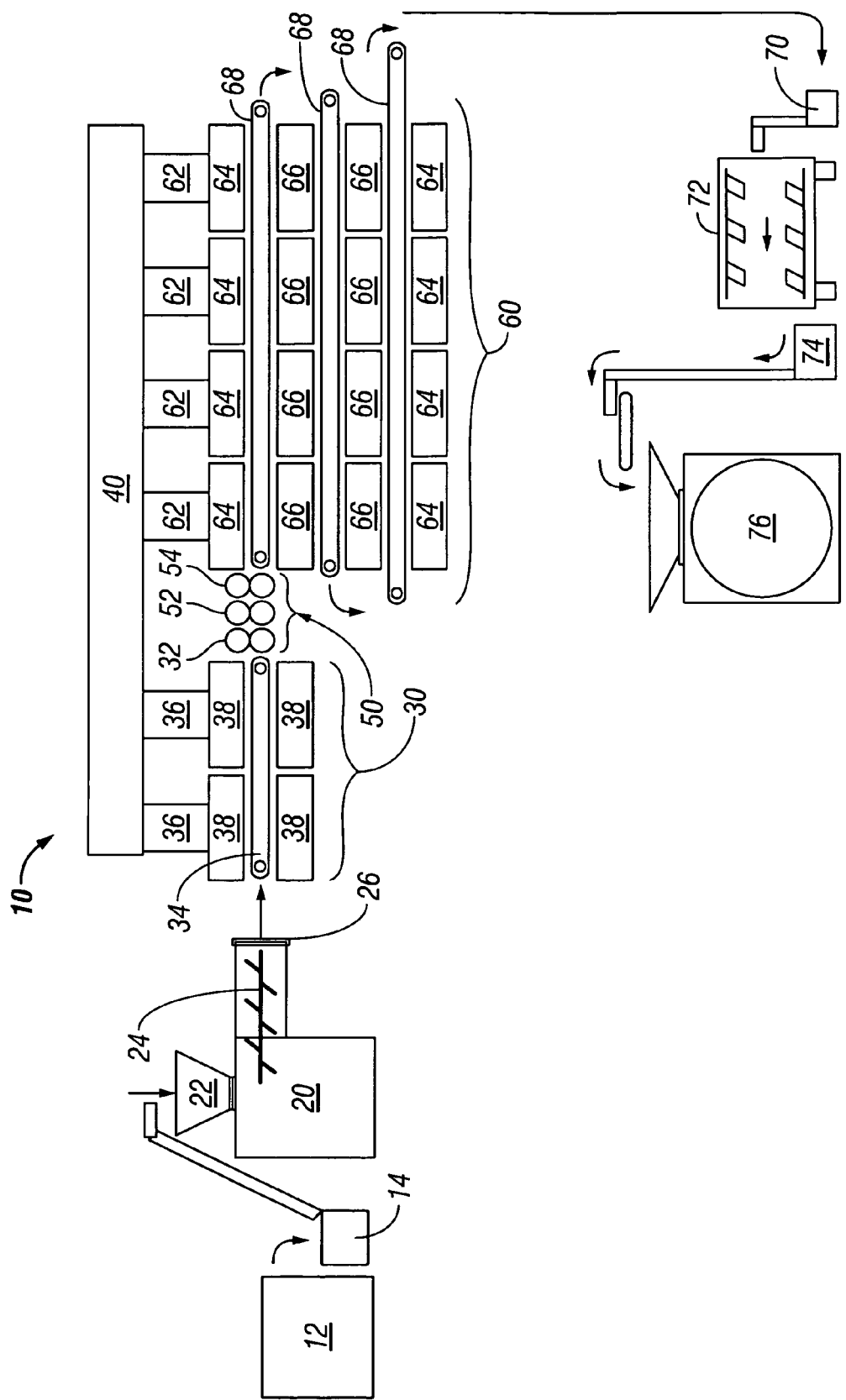
FIG. 1 is a schematic view of a manufacturing process according to this invention utilizing a chewing gum piece coater.

In a process, apparatus, and system of this invention, a slab or sheet of a confectionery material having a tacky surface, such as a chewing gum material, is processed through forming, rolling, and scoring without substantial use of a rolling compound or powdered non-stick agent. Typically, a confectionery material having a tacky surface under processing conditions is manufactured as a rolled sheet having a set or predetermined thickness and width. From such rolled sheet, portions may be separated and packaged for commercial sale.

The confectionery material may be any hard candy, soft candy, chewing gum, or other confectionery substance, or compound that has a fluid phase or may take a flowable form. In other words, the confectionery material may be any material that may be heated, melted, or dissolved to form a syrup, or be dissolved in a liquid to become flowable as is commonly known in the art. Nonlimiting examples of suitable confectionery materials that are flowable or may be placed into a flowable state include syrups, liquids or solids for making hard candies, soft candies, lollipops, fondants, toffees, jellies, chewing gums, chocolates, gelatins and nougats. The confectionery material may include sugar or may be sugar-free. Coloring may be added to the confectionery substrate as desired. The confectionery material may also include a pharmaceutical product or a medicament.

The preferred confectionery produced according to this invention is a chewing gum. Typically, a chewing gum material suitable for use in the process of this invention is composed of a gum base, flavorings, and sweeteners and may contain other components such as fillers and binders. Because of the viscoelastic characteristics of chewing gum materials, these materials are formed at elevated (above room or ambient) temperatures into sheets and pieces suitable for commercial sale. Further, chewing gums having desirable characteristics such as, but not limited to, flavor release, elasticity, soft texture, typically have a tacky surface at processing temperature conditions. In order to process such tacky materials through processing equipment such as rollers, a powdered non-stick agent (sometimes referred to as a rolling compound) is applied to prevent the rolled gum mass from sticking to processing equipment. This is similar to using flour as a non-stick agent in rolling pie or cookie dough.

In an embodiment, chewing gum is manufactured in a process substantially without a non-stick agent. In such process, the chewing gum is produced, extruded and scored laterally and longitudinally substantially without application of a non-stick agent. As referred to herein, "non-stick agent" includes sugar, sugar alcohols, calcium carbonate, oil and other particulates or lubricants specifically applied to the surface of chewing gum to prevent sticking of the chewing gum to processing machinery such as conveyors, glide plates, and rollers. Typically, the non-stick agent is in powder form. As further referred to herein, "without substantial use of a non-stick agent" means less than or equal to 0.18 weight % non-stick agent based upon the slab weight which exits an extruder.

In an embodiment of this invention, a chewing gum surface is cooled to reduce tackiness. The surface may be cooled using chilled rollers, air, or other cooling apparatus. In an embodiment of this invention, the surface temperature of gum material exiting a slab extruder is lowered prior to passing through chilled rollers by using air or other gas directed to strike the surface of such material to transfer heat away from the gum material. This type of air typically is referred to as "impingement air" and preferably streams of such impingement air are directed at both surfaces of a moving slab or sheet of gum material during processing.

The term "tacky" or "tacky surface" refers to a property of a confectionery such as a chewing gum material in which the surface of such material is adhesive or gummy to the touch such that portions of such material will tend to adhere to each other or to processing equipment parts such as rollers, and "substantial adhesion" means a condition in which such material joins to processing equipment parts to an extent that requires stoppage or interruption in processing, which is referred to as "downtime."

The term "rollers" includes scoring rollers, calender rollers, embossing rollers, and other rollers which typically are rolling cylinders which contact a gum material and function to form, shape, flatten, score, cut, conduct heat, emboss, otherwise process, or provide movement to a slab or sheet of such material. "Scoring rollers" includes circular scoring rollers which score (e.g., place an indentation into gum material) or cut the chewing gum longitudinally, cross scoring rollers which score or cut the chewing gum laterally or forming rollers which score or cut a chewing gum laterally and longitudinally. "Calender rollers" (sometimes referred to as "calender rolls") includes rollers which contact the surface of the chewing gum typically without scoring or cutting and include rollers which may reduce the thickness of the chewing gum, reduce surface imperfections upon the chewing gum, provide embossing, and contact the surface of the chewing gum to impart heat transfer. "Forming rollers" may include calender rollers, scoring rollers, embossing rollers, and the like, which shape or process a gum sheet. The term "rollers" also includes systems comprising two rollers, a roller and a conveyor, a roller and a glide plate, and other systems which affect the chewing gum surface through scoring, cutting, surface thickness or imparting heat transfer using at least one rotating cylinder. Rollers may have a non-stick surface coating such as polytetrafluoroethylene (such as sold under the Teflon® brand) or polished stainless steel.

The terms "chilled rollers" or "cooled rollers" refer to rollers which have had their surface temperature lowered below ambient temperature. In an embodiment, the surface temperature is lowered by circulating coolant liquid through or within the roller. Typical coolant materials include propylene glycol, ethylene glycol, and aqueous solutions thereof and salt-containing solutions such as saline solutions. The temperature of the chilled rollers typically is below the temperature of the surface of the chewing gum during processing and may be well below the freezing point of water. The rollers are cooled sufficiently to maintain the surface of a chewing gum slab or sheet in a cooled state during the time of contact between the roller and the slab or sheet as to not require substantial (and preferably no) powdered non-stick agent. Typically, the surface of the chilled roller is maintained at a temperature below 0° C. (32° F.), preferably below −5° C. (23° F.) and more preferably below −7° C. (19° F.). The chilled roller should be at a temperature low enough to have non-stick properties but not so cold as to make the sheet brittle or otherwise unworkable. The surface of the chilled roller is typically above −15° C. (5° F.), preferably above −10° C. (14° F.) and more preferably above −9° C. (16° F.).

Typically, the dew point of the air surrounding the chilled rollers used in this invention is controlled to prevent water condensation on the chilled rollers.

The slab of chewing gum composition, which exits an extruder, is cooled, typically with impingement air, such that preferably both surfaces of the slab are cooled with respect to the interior of the slab. A warm center will tend to reheat the surface without further surface cooling and will produce a slab which is sufficiently flexible and formable to permit further processing. A totally cooled slab would be less flexible and more difficult to process through calender or scoring rollers.

The slab of extruded chewing gum composition (which is heated to a temperature consistent with extrusion) is transferred from an extruder onto a moving conveyor, which functions to transport the slab to forming rollers. Although typically the slab passes directly from the extruder exit onto the moving conveyor, chilled forming rollers may be inserted between the extruder and the conveyor. Typically, the conveyor is an open web or mesh such that contact between a heated slab and the typically metallic (such as stainless steel) conveyor is minimized and the ability for air flow on both surfaces of the slab is maximized. A typical conveyor is a continuous roll of an open mesh which moves over transport rollers. The length of the conveyor is designed to be sufficient for the surface of the transported slab to be sufficiently cooled to subsequently pass through a first cooled calender roller.

In accordance with this invention, the surfaces of the slab of chewing gum composition are cooled as the slab is conveyed from the extruder to a series of cooled forming rollers. Typically, the surfaces are cooled by contact with impingement air directed from air jets positions above and below the conveyor. Although the preferable system is for the conveyor to be constructed as a mesh or open web in order to facilitate impingement air directed at both surfaces, other systems are possible such as using a cooled conveyor belt or other systems which permit initial surface cooling of the chewing gum slab.

Surface cooling may be controlled such as by the length of the conveyor system, the temperature of the cooling impingement air, the velocity of the cooling impingement air, and the linear speed of the conveyor system. The extent of cooling should be sufficient to permit the slab to pass through subsequent cooled forming rollers without undue sticking or fouling without use of a powdered non-stick agent. Preferably, the transported slab is not cooled to a low temperature (especially a low temperature throughout the slab), which makes the slab difficult to process in the forming rollers.

Impingement air is not used with powdered non-stick agents because the non-stick agents would be blown from surface of the slab, which would cause manufacturing problems. Typically, the temperature of the slab prior to cooling is between 53° C. (127° F.) and 37° C. (100° F.). It has been discovered that cooling impingement air creates a surface temperature that is cooler than the center of the slab. Typically, surface temperature may be reduced to less than 50° C. (122° F.), preferably less than 37° C. (95° F.), and more preferably less than 33° C. (92° F.). Typically, the surface of the chewing gum composition slab is cooled about 2° C. (4° F.) to 10° C. (19° F.) relative to the center of the slab. The surface is not reduced to a temperature so cold as to cool the core to a point at which the temperature of the core becomes unworkable. Typically, surface temperature should be above 26° C. (80° F.), preferably above 30° C. (85° F.), and more preferably above 32° C. (90° F.).

The chewing gum will not adhere to the processing equipment if the processing equipment includes non-stick equipment, the chewing gum is conditioned to prevent adhering to the processing equipment (i.e. through surface treatments or other conditioning, or if a non-stick agent is applied to the surface of the tacky chewing gum. Such non-stick agents include sugar, sugar alcohols, calcium carbonate, oil, or other particulates. Non-stick agents used in excess are generally undesirable as they produce environmental dust, create potential product changeover issues, and are an additional expense as the non-stick agent may be later removed prior to coating the chewing gum or packaging the chewing gum in wrappers. In an embodiment of this invention, a small, non-substantial, amount of rolling compound may be used to reduce the tackiness but not completely eliminate tackiness. Typically, such addition of non-stick agent is in an amount less than or equal to 0.18 weight % non-stick agent based upon the slab weight which exits the extruder, preferably less than 0.15 wt % and more preferably less than 0.10 wt %.

In an aspect of this invention, the post-extrusion cooling conveyor cools the surface of the chewing gum to reduce tack yet leaves the chewing gum pliable to permit easy forming and scoring. In a relatively short period of time, heat from the core of the chewing gum will conduct toward the surface; however, at a typical velocity of the conveyor, the temperature differential is maintained through the forming rollers.

After the surface of the chewing gum composition slab has cooled sufficiently to permit contact with a cooled solid surface without sticking or fouling, the cooled slab is transferred from a moving conveyor to a cooled roller, typically a cooled calender roller and preferably a double roller in which the slab travels between two moving rollers. Preferably the moving slab does not contact the static base of the roller apparatus and is transferred directly from a moving conveyor to the roller. Preferably, the base of the roller is set below the top level of the conveyor. Typically, the initial calender roller forms the chewing gum slab into a uniform sheet with predetermined width and thickness dimensions depending upon the size of the roller mechanism and the space between the rollers. One or more cooled calender rollers may be used.

Typically, after a uniform sheet of chewing gum is formed, the sheet passes through one or more (typically two) scoring rollers, which divide the chewing gum sheet into individual pieces such as sticks, tabs, pillows, or other segments for further processing. Typically, only an indentation is made on the sheet for the pieces, which are separated and processed in a subsequent step. Preferably, the scoring rollers also are chilled or cooled.

Figure 2:
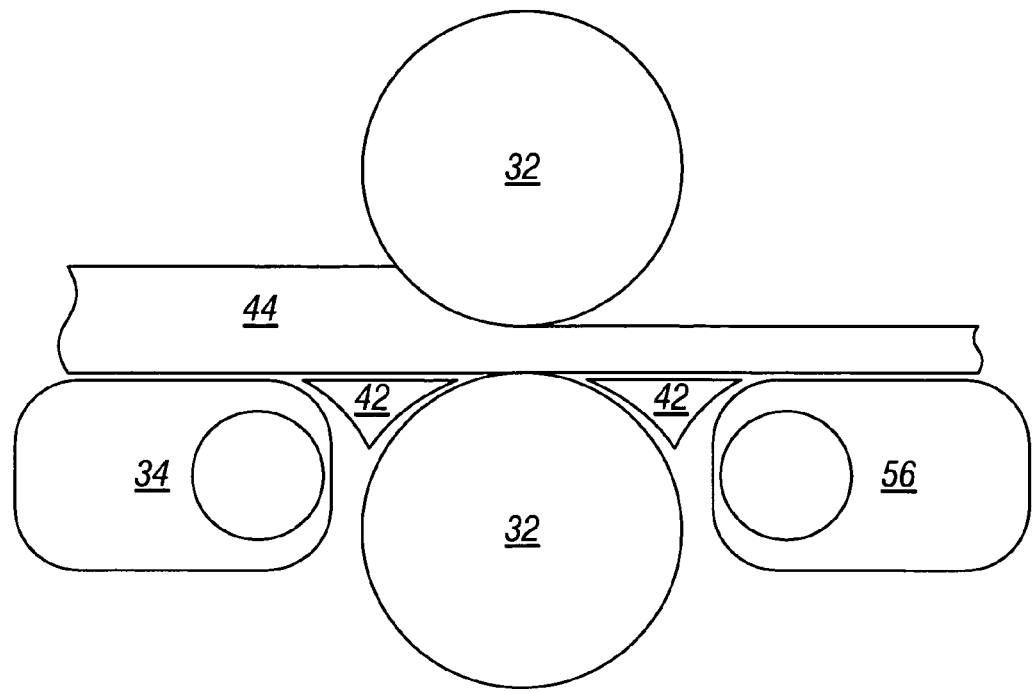
FIG. 2 is a view of a chilled calender roller as used in this invention.
Figure 3:
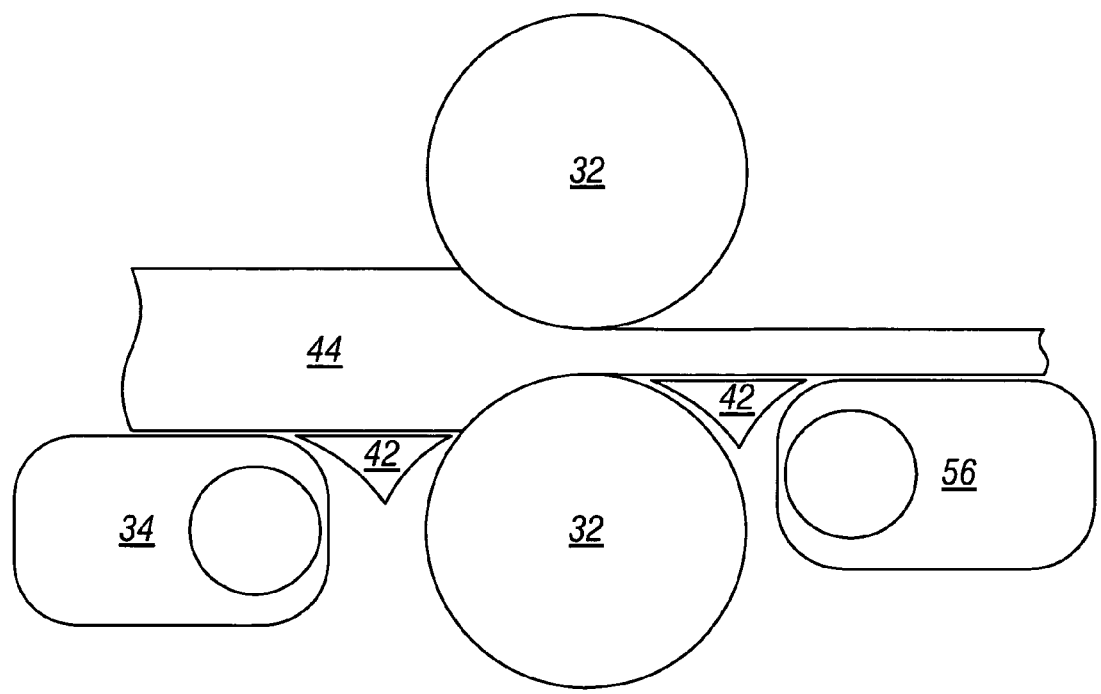
FIG. 3 is a view of an alternate chilled roller as used in this invention.
Figure 4:
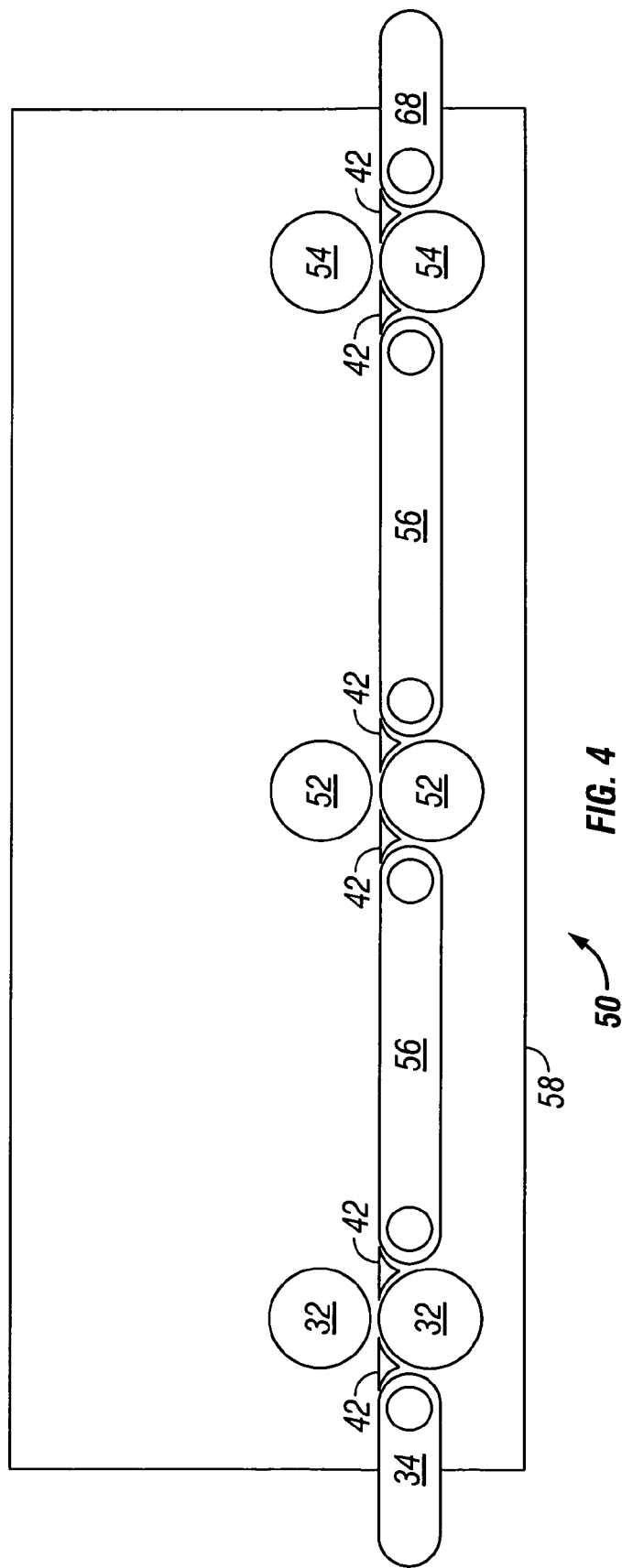
FIG. 4 is a schematic view of a forming process according to this invention.

Further aspects of the processes, systems, and apparatuses of this invention are described with reference to the figures. FIGS. 1 and 5-8 illustrate embodiments of Apparatus 10. FIGS. 2 and 3 illustrate embodiments of the chilled rollers and FIG. 4 illustrates an embodiment of the chilled rollers in a closure.

Apparatus 10 includes a mixer or mixing unit 12, which may be a continuous mixer. If mixing unit 12 is a continuous mixer, the continuous mixer may be capable of mixing both chewing gum base and finished chewing gum composition. Mixing unit 12 may also be a batch mixer in which finished gum is made from pre-made chewing gum base. Irrespective of whether the mixing unit 12 continuously produces chewing gum or batch mixes chewing gum, the mixing unit is sized at least to accommodate the maximum throughput of manufacturing apparatus 10. A typical throughput of apparatus 10 is between 500 and 5500 kg/hour (1100 and 12,000 lbs/hour) and more preferably between 2750 and 4500 kg/hr (6000 and 10,000 lbs/hour)

The mixing unit 12 discharges chewing gum to a conveyor 14. The chewing gum may be in the form of a chewing gum loaf, a continuous extrudate, a semi-continuous extrudate or other forms or strands of chewing gum composition. Chewing gum mixed in the mixing unit has a typical output temperature between 50-53° C. (122-127° F.). In order to accommodate potential differences in the temperature and/or rheological properties of chewing gum exiting mixing unit 12, the chewing gum may reside upon the conveyor 14 for a period of time typically from 1 minute to 20 minutes. In an embodiment, the conveyor 14 may be exposed to ambient air (typically about 15-25° C. (59-77° F.)). Alternatively, the conveyor 14 may be exposed to conditioned air. The conditioned air is typically between 1.5-10° C. (35-50° F.), preferably between 3.3-8.3° C. (38-47° F.) and more preferably between 6-7° C. (43-45° F.), The conditioned air may also have a relative humidity between 36 and 40 percent. The term "rheology properties" includes deformation, flow, and elastic properties. Rheological properties of chewing gum are influenced by temperature, crystallization of sugar or polyols, formulation of chewing gum, and other factors. Chewing gum exiting the conveyor 14 will have a temperature between 48-53° C. (118-127° F.) with a typical temperature of between 50-53° C. (122-127° F.).

Chewing gum composition enters a forming extruder 20 via a receiving hopper 22. An extruder screw 24 or extruder screws receive chewing gum from the hopper 22. The extruder 20 extrudes the chewing gum through die 26 into a slab. The extruder 20 may be an extruder as manufactured by Togum (Model 240) or Bosch (Model 1030 and 1050). The extruder 20 may include a water jacket with water circulating at between typically 48-50° C. (118-122° F.). Additionally, the extruder adds heat to the chewing gum by friction. The temperature of the composition in the extruder is such to permit movement through the extruder but not at such a high temperature as to volatize flavors or deform upon exit from the nozzle. Typically the temperature of the composition exiting the extruder is less than 53° C. (127° F.), preferably less than 50° C. (122° F.) and still preferably less than 49° C. (120° F.). Also, the temperature of the composition exiting the extruder is typically above 37° C. (98° F.), preferably above 43° C. (110° F.) and more preferably above 47° C. (116° F.).

The extruder 20 may extrude the chewing gum from the die 26 at a consistent pressure and temperature. Alternatively, the extruder 20 may adjust the pressure and temperature based upon feedback from downstream processes such as conveyors, forming equipment, etc.

A slab of chewing gum may be in a regular slab format. Typically, thickness of a regular slab is 3 to 12 cm (1 to 5 in) and more preferably between 5 and 10 cm (2 and 4 in). A regular slab may have a width between preferably 10 and 40 cm (4 and 16 in) and more typically 20 to 30 cm (8 and 12 in).

Alternatively, chewing gum may be extruded from die 26 in a thin slab or ribbon. The thin slab may have a thickness typically from 0.15 to 3 cm (0.06 to 1.2 in), and more typically, from approximately 0.4 cm (0.16 in) to approximately 0.5 cm (0.20 in), 0.76 cm (0.30 in) or 1.02 cm (0.40 in). This slab may have a typical width from approximately 10 cm (4 in) to approximately 70 cm (28 in) wide and more typically from 2.5 to 55 cm (1 to 22 in) wide. The thickness of the slab may depend upon whether the chewing gum is to be formed into a chewing gum stick, tab, or pellet.

In an embodiment, the extruder 20 may be capable of extruding a slab of chewing gum at a rate between 550 and 5500 kg/hr (1200-12,000 lbs/hr). More specifically, the extruder 20 may be capable of extruding a thin slab between 2000 and 5000 kg/hr (4,400 and 11,000 lbs/hr). In an additional embodiment, the extruder is capable of extruding between 2750 and 4500 kg/hr (6,000 and 9,900 lbs/hr).

The chewing gum exiting the extruder 20 may have a tacky surface due to formulation, temperature, rheology or other factors. Under such processing conditions used in this invention, the chewing gum may be formed, scored or cut without adhering to the processing equipment and creating down time.

The chewing gum exiting the die 26 is transferred to a conveyor 34. Conveyor 34 is preferably wire mesh which has a minimum of contact area with the chewing gum. Preferably the conveyor is a stainless steel open mesh style conveyor. Such preferred conveyor 34 typically has an area of contact with the chewing gum of between 10-75 percent of the total conveyor area, preferably between 25-50 percent of the total conveyor area and more preferably between 30-40 percent of the total conveyor area.

Figure 8:
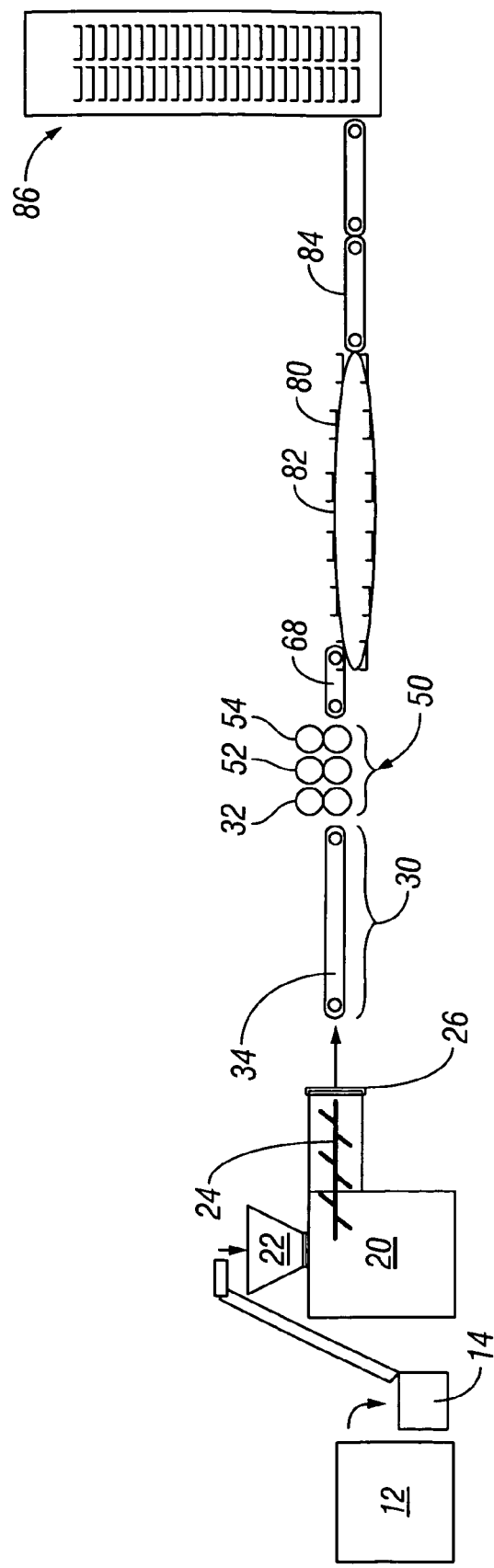
FIG. 8 is a schematic view of a manufacturing process according to this invention utilizing a forming unit without pre-scoring cooling or post-scoring cooling.

The chewing gum exiting the die 26 may be passed through one or more calender rolls (not shown) to size the chewing gum or smooth any surface irregularities. Such calender rolls are preferably chilled. Chilled rollers controlling the surface temperature permit tacky slabs or ribbons of chewing gum to pass between the chilled rollers without adhering to such an extent as to cause down time. As seen in FIGS. 1, 5, 6 and 7, the conveyor 34 may be adjacent at least one convective cooling unit 36. Convective cooling unit 36 may be supplied by air from supply system 40. Supply system 40 may provide conditioned air which is temperature and relative humidity controlled. The air supply system 40 may be adjusted to condition the chewing gum slab or the surface of the chewing gum slab. The conditioned slab is less likely to stick to conveyor 34, calender rolls 32 or forming unit 50. Alternatively, as illustrated in FIG. 8, the apparatus 10 may not include a convective cooling unit.

The air supply ducts are connected to impingement air nozzles 38 which direct air onto the conveyor from a range of 240 meters per minute "MPM" (800 feet per minute ("FPM")) to 1200 MPM (4000 FPM) and more preferably to approximately 900 MPM (3000 FPM). Impingement air nozzles 38 may be facing a top surface of the chewing gum slab, a bottom surface of the chewing gum slab projecting air through conveyor 34, or a combination of both top and bottom surfaces.

The area between the extruder die 26 and the forming unit 50 may be generally referred to as a post-extruding cooling unit 30. The post-extruding cooling unit 30 cools and/or conditions the chewing gum slab for consistent scoring of the chewing gum pieces. The post-extruding cooling unit 30 may alter the properties of the surface of the chewing gum or may completely cool the chewing gum. In a preferable embodiment, the post-extruding cooling unit 30 cools the surface of the chewing gum to reduce tack yet leaves the chewing gum pliable to permit easy scoring. Given a relatively short period of time, heat from the core of the chewing gum will conduct toward the surface; however, given the velocity of the conveyor, a temperature differential may be maintained through the forming unit 50.

In an embodiment, forming unit 50 may be made up of sizing rolls or calender rolls 32, cross scoring unit 52 and a circular scoring unit 54.

FIG. 2 illustrates a suitable calender roll 32 configuration for use in this invention. Preferably, the base of the chewing gum 44 is maintained on the same plane when passed from mesh conveyor 34, across glide plate 42, through the calender roll despite the calender roll reducing the width, and onto transfer conveyor 56. As such, the cooling load of the top calender roll is increased but the plane of processing is maintained constant. This configuration of calender rolls 32 may also be used for cross scoring unit or rolls 52 and circular scoring unit or rolls 54.

FIG. 3 illustrates another suitable calender roll configuration for use in this invention. Alternatively, the chewing gum 44 is approximately centered between two calender rolls 32. As such, the cooling load of both the top and bottom calender roll is evenly distributed but the plane of processing is changed from one side of the calender rolls 32 to the next. However, the base of the chewing gum is maintained on a first plane when passed from mesh conveyor 34 and across a first glide plate 42 but on a second plane exiting the calender rolls 32, across a second glide plate 42 and onto a transfer conveyor 56. This configuration of calender rolls 32 may also be used for cross scoring unit 52 and circular scoring unit 54.

The configurations as seen in FIGS. 2 and 3 permit adjusting the width of the chewing gum 44 by adjusting the top calender rolls. It has been found that adjusting the top calender roll is easier to control than the bottom calender roll. Although not illustrated in FIGS. 2 and 3, the rollers of the forming unit 50 may have a similar configuration. The calender rolls may be configured to permit the chewing gum 44 to move directly to a glide plate, a moving conveyor or additional rollers. Preferably, the rolls are configured to avoid contact with stationary parts.

The transfer conveyor 56 is preferably a solid conveyor using a food grade polymer belt. The transfer conveyor 56 permits controlled transfer of the chewing gum from the calender rolls 32 and an internal scoring unit (either cross scoring unit 52 or circular scoring unit 54 whichever is placed internally). The transfer conveyor belt should be fabricated for minimal deformation during stopping and starting of the belt to prevent deformation in the chewing gum during stopping, starting, and speed fluctuations.

The cross scoring unit 52 and the circular scoring unit 54 may be pairs of scoring rollers. Alternatively, the scoring units 52, 54 may be a single roller scoring the chewing gum against a conveyor. Still alternatively, the forming unit 50 may use a set of forming rollers or a forming roller against a conveyor which simultaneously cross and circular scores.

The forming unit 50 may make a slight indentation in the chewing gum slab which would require additional processing steps to separate the chewing gum pieces. Alternatively, the forming unit 50 completely separates the chewing gum into individual pieces.

The forming unit 50 may include glide plates 42 between an adjacent calender roll 32, cross scoring unit 52, or circular scoring unit 54. When using glide plates, the rollers themselves provide velocity to the chewing gum to move the chewing gum to the next set of rollers or to another conveyor. Glide plates may be coated with a non-stick material such as polytetrafluoroethylene or polished stainless steel. Conventionally, however, coating rollers or glide plates with a non-stick material such as polytetrafluoroethylene is not preferred due to manufacturing cost and a tendency of pieces of a coating to come off during processing.

As seen in FIG. 4, conveyors 56 may be between and adjacent calender roll 32, cross scoring unit 52, or circular scoring unit 54. When using conveyors 56, chewing gum may move directly from the rollers to the conveyor without use of a glide plate 42. Alternatively, a glide plate may be included for incidental contact and support during downtime but not during production. As such, the chewing gum does not encounter a stationary contact surface during production.

To further permit product flow, glide plates 42 may include indentations or grooves matched to the chewing gum passing through the scoring system. During circular scoring, the chewing gum may take on a rounded shape and indentations or grooves may be placed upon the glide plate to accommodate the rounded shape.

Scoring rollers preferably are chilled. Alternatively, the scoring rollers are coated with a non-stick material such as polytetrafluoroethylene. Still alternatively, the scoring rollers are chilled and coated with a non-stick material such as polytetrafluoroethylene. Scoring rollers have not previously been coated with a non-stick material due to the protrusions upon the scoring rollers and the likelihood of having the non-stick material come off of the scoring rollers.

The scoring rollers may also be in a temperature and humidity controlled environment such as being enclosed in an insulated and sealed closure 58. The environmental air around the scoring rollers may have a dew point just above the temperatures of the rollers. Under such conditions a thin layer of moisture may accumulate on the rollers and enhance the non-stick properties of the scoring rollers.

Alternatively, a closure 58 may be provided to control the environment about the scoring system 50 which may be conditioned to have a dew point of −13 to -12° C. (8 to 10° F.). Under such conditions, the temperature of the rollers may be cold and the surface of the rollers dry. Surface temperatures from −12 to −6° C. (10 to 20° F.) permit the chewing gum to pass through the scoring system 50 without adhering to the rollers.

Still alternatively, the environmental air around the rollers may have a dew point above the temperature of the rollers and the rollers have a temperature below freezing temperature. Under such conditions ice may form upon the rollers and create non-stick surface properties.

Upon exiting the forming unit 50, in one embodiment, the chewing gum slab may enter a post-scoring area where the chewing gum is treated for later packaging and/or processing. In the embodiment illustrated in FIG. 7, the post-scoring area is a tempering room 86. In this embodiment, products exiting the forming unit 50 are transported using a conveyor 68 to trays 80. The chewing gum may be stacked as sheets into trays 80 which may be on a rotating conveyor 82. A non-stick agent may be applied in between each sheet to prevent the sheets from sticking to one another during storage or while waiting to be fed into a wrapping machine. The trays 80 may be moved via a conveyor 84 to tempering room 86.

The tempering room holds the chewing gum slab for a pre-determined period such that the chewing gum hardens for packaging, such as for stick and/or tab chewing gum, or further processed in a pellet coating machine. Alternatively, the post-scoring area may include a post-scoring cooling unit 60.

Figure 5:
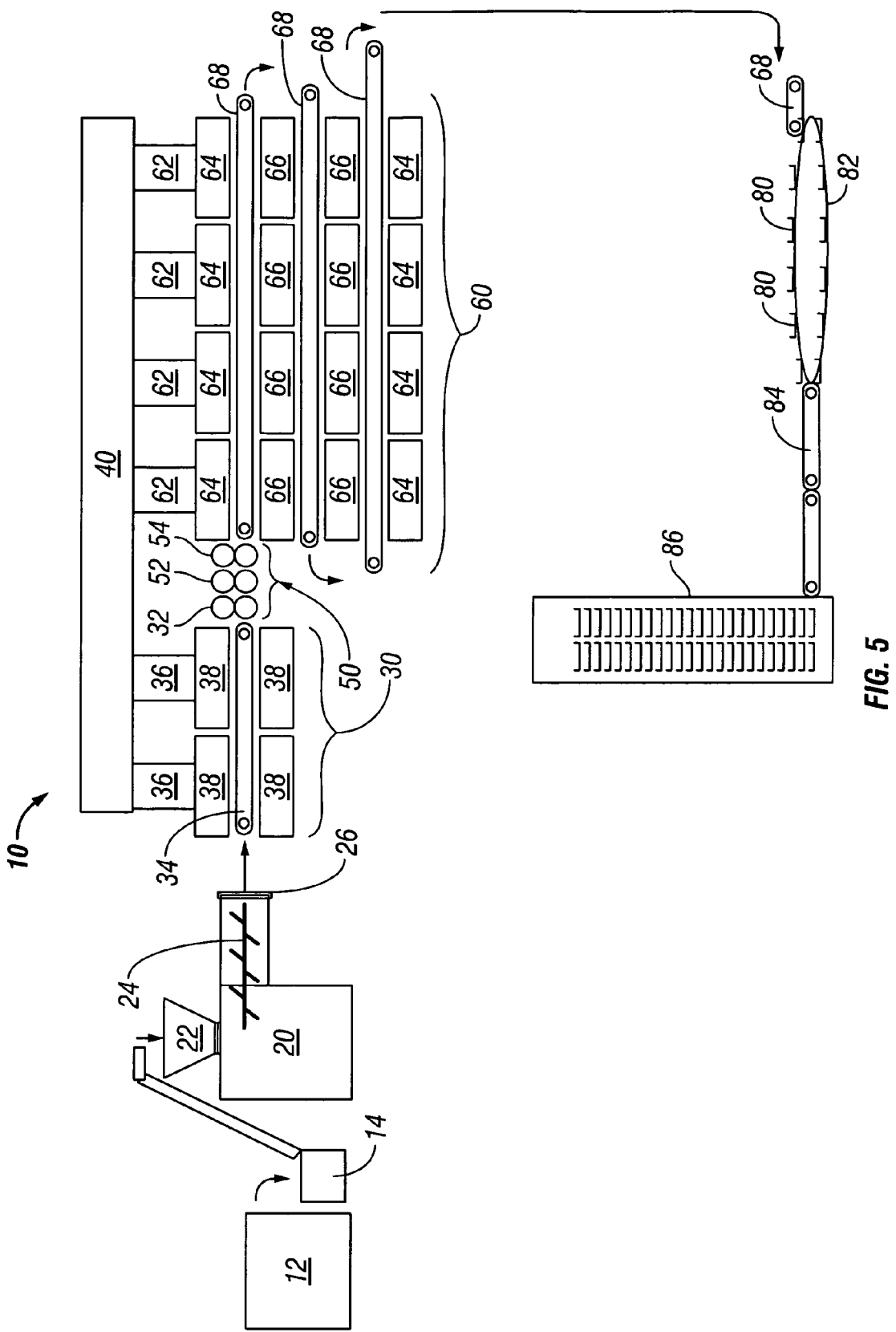
FIG. 5 is a schematic view of a manufacturing process according to this invention illustrating trays for collecting sheets of chewing gum.
Figure 6:
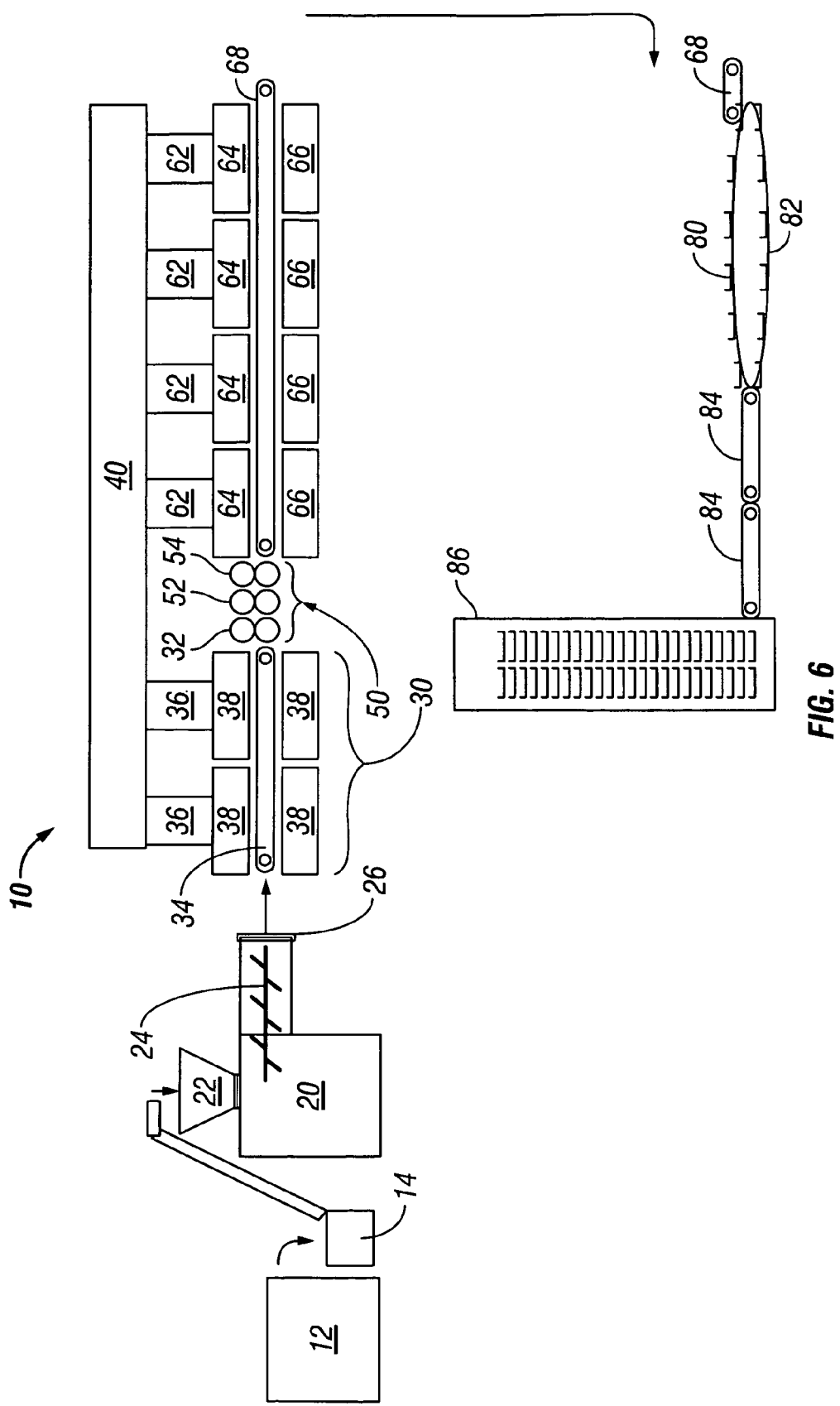
FIG. 6 is a schematic view of a manufacturing process according to this invention illustrating a single tier post-cooling unit.
Figure 7:
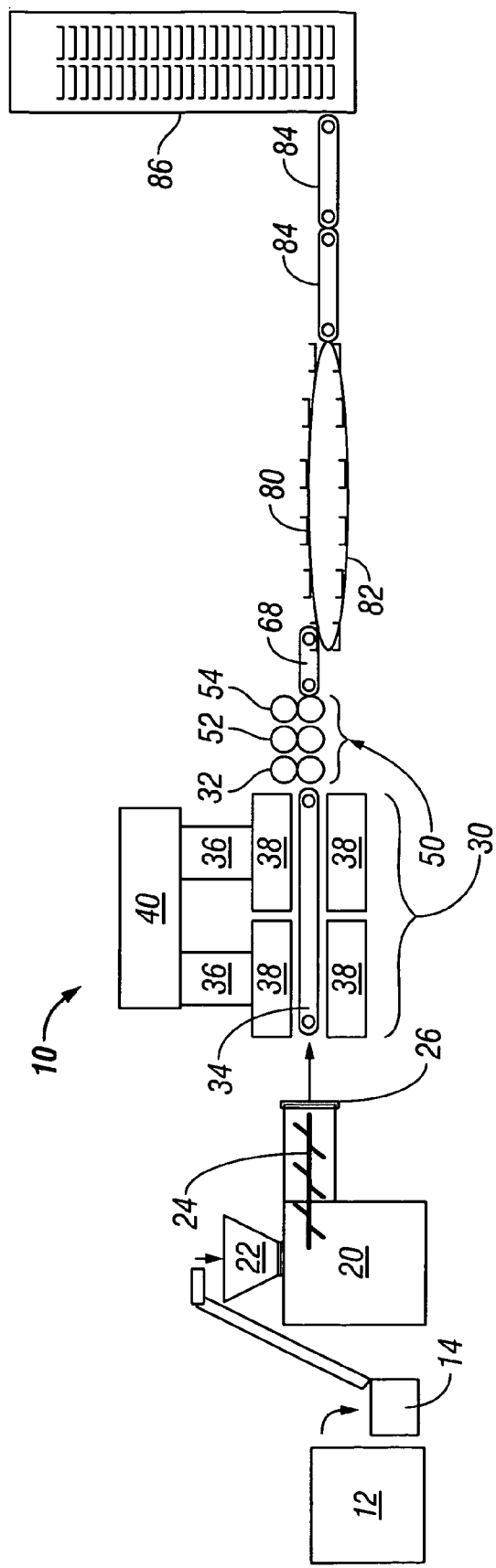
FIG. 7 is a schematic view of a manufacturing process according to this invention illustrating trays for collecting sheets of chewing gum for transport directly to a tempering room.

As seen in FIGS. 1, 5 and 6, the post-scoring cooling unit 60 may include a cooling area which supplies cooled air through air ducts 62. The air ducts 62 may be supplied by air supply 40 which is also supplying the air ducts 36 in the pre-scoring area 30. The post-scoring air supply ducts may supply one-way impingement ducts 64 or two-way impingement ducts 66.

In the embodiment illustrated in FIG. 6, a conveyor 68 receives chewing gum slabs or individual pieces from the forming unit 50. A single pass conveyor 68 may have a long length sized to cool the chewing gum entering the post-scoring area at approximately 43° C. to a temperature between 15-20° C. With a single pass conveyor, one-sided impingement ducts 64 may be used.

In the embodiments illustrated in FIGS. 1 and 5, the conveyor 68 may be a multi-pass conveyor (i.e. a first conveyor is stacked upon a second conveyor 68 and third conveyor 68). In this embodiment products from the first conveyor 68 drops onto a second conveyor once it has achieved a temperature at which point the chewing gum does not deform during the transfer or below approximately 35° C. (95° F.). The second conveyor conveys products back under the first conveyor through two-way impingement ducts 66. The two-way impingement ducts 66 may also be two one-sided impingement ducts facing away from one another. The impingement ducts 66 blow air both up through the first conveyor 68 and down upon the chewing gum pieces on the second conveyor. The chewing gum pieces move along the second conveyor to a section of sheet metal or other connector which moves the chewing gum pieces to the third conveyor down below. The third conveyor moves back between an impingement duct 66 and an impingement duct 64. The final exit temperature from the third conveyor 68 is between 15-20° C. (59-68° C.).

In an alternative embodiment, the post-extruding cooling unit 30 and the post-scoring cooling unit 60 may be within the same cooling unit enclosure. In such an embodiment, the post-extruding cooling unit includes a conveyor which passes through the enclosure to a forming unit and then continues through the enclosure for post-scoring cooling. In still another embodiment, the forming unit may be outside of the enclosure.

As seen in FIG. 1, the chewing gum may be separated into individual pieces and collected in tubs or bulk storage containers for storage and later use in pellet forming systems such as for making Wrigley Eclipse® chewing gum. The chewing gum may also be sent to a conveyor 70 which may feed a piece separator 72. The piece separator 72 breaks the chewing gum into pieces for later feeding into a coating unit 76. A non-stick agent may be applied during the tumbling to prevent the pieces from sticking to one another during storage or while waiting to be fed into the piece coater or even while sitting in a coater 76 waiting to be coated. The non-stick agent is added in amounts less than 1.0% by weight of the total chewing gum piece, preferably less than 0.5%, and still preferably less than 0.2%.

Exiting the tumbler the chewing gum may be sent to storage for tempering or may go immediately to the piece coater 76. When being sent to a coater 76 the pellets may be elevated using a conveyor 74. Alternatively, as seen in FIG. 5, the chewing gum may be stacked as sheets into trays 80 which may be on a rotating conveyor 82. A non-stick agent may be applied in between each sheet to prevent the sheets from sticking to one another during storage or while waiting to be fed into a wrapping machine. The trays 80 may be moved via a conveyor 84 to a tempering room 86.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A process for manufacturing a chewing gum sheet without substantial use of a powdered non-stick agent comprising:
    a) extruding a slab having a tacky surface of heated chewing gum composition;
    b) passing the slab through at least one cooled roller to form a chewing gum sheet with predetermined dimensions, wherein the at least one cooled roller is maintained at a temperature of from 5° F. to 32° F.; and further wherein the at least one cooled roller is in a temperature and humidity controlled environment, wherein the environmental air around the at least one cooled roller has a dew point above the temperature of the at least one cooled roller;
    c) wherein a closure is provided around the at least one cooled roller to control the environmental air to have a dew point of from 8° F. to 10° F.

2. The process of claim 1 further comprising the step of conveying the slab on a moving conveyor to cool the surface of the slab.

3. The process of claim 2 in which the chewing gum slab is cooled on a moving conveyor with impingement air flow.

4. The process of claim 2 in which the chewing gum slab is cooled on the moving conveyor with ambient air.

5. The process of claim 1 in which the chewing gum slab is conveyed from the extruder to the cooled roller without contact with a static dead plate.

6. The process of claim 1 in which a chewing gum sheet is passed through at least one scoring roller with less than or equal to 0.18 weight % non-stick agent based on the slab weight.

7. The process of claim 6 in which a chewing gum sheet is passed through laterally and/or longitudinally scoring rollers.

8. The process of claim 7 in which the chewing gum sheet is scored into pieces.

9. An apparatus for producing a chewing gum sheet comprising:
    a) an extruder for extruding a chewing gum mass into a slab having a tacky surface of heated chewing gum;
    b) a conveyor for receiving the chewing gum slab;
    c) an impingement air flow system for cooling the chewing gum slab upon the conveyor; d) at least one cooled roller for receiving the chewing gum slab from the conveyor and forming a chewing gum sheet with predetermined dimensions, wherein the at least one cooled roller is maintained at a temperature of from 5° F. to 32° F.; and further wherein the at least one cooled roller is in a temperature and humidity controlled environment, wherein the environmental air around the at least one cooled roller has a dew point above the temperature of the at least one cooled roller;
    e) wherein a closure is provided around the at least one cooled roller to control the environmental air to have a dew point of from 8° F. to 10° F.

10. The apparatus of claim 9 in which the impingement air flow system is for cooling the top and bottom surfaces of the chewing gum slab.

11. The apparatus of claim 9 further comprising at least one scoring roller.

12. The apparatus of claim 11 in which the scoring roller scores the chewing gum sheet laterally and/or longitudinally.

13. The apparatus of claim 9 further comprising a conveyor for receiving the chewing gum sheet, an impingement air flow system for cooling the chewing gum sheet upon the conveyor.

14. The apparatus of claim 13 wherein the conveyor is a multi-tier conveyor.

15. The apparatus of claim 9 further comprising an applicator for applying non-stick agent to the chewing gum sheet.

16. The apparatus of claim 15 further comprising a tray system for stacking the chewing gum sheets.

17. The apparatus of claim 9 further comprising a coating system for separating the chewing gum sheets into individual pieces and coating the individual pieces.

18. A system for producing chewing gum pieces comprising:
    a) a mixer for producing a chewing gum mass;
    b) an extruder for extruding the chewing gum mass into a slab having a tacky surface; c) a cooled forming and scoring unit for manipulating the slab into a chewing gum sheet with lateral and/or longitudinal scores, wherein the forming unit comprises at least one cooled roller maintained at a temperature of from 5° F. to 32° F.; and further wherein the at least one cooled roller is in a temperature and humidity controlled environment, wherein the environmental air around the at least one cooled roller has a dew point above the temperature of the at least one cooled roller;
    d) wherein a closure is provided around the at least one cooled roller to control the environmental air to have a dew point of from 8° F. to 10° F.;
    e) a cooled conveying system for receiving the chewing gum sheet and cooling the surface of the chewing gum.

19. The system of claim 18 further comprising a cooled conveying system receiving the chewing gum slab from the extruder and cooling the surface of the chewing gum.

20. The system of claim 18 wherein the slab is a ribbon.

21. The process of claim 1, wherein the extruded slab has a thickness of from 0.15 cm to 3 cm.

22. The process of claim 1, wherein prior to passing the slab through the at least one cooled roller, the slab is transferred to a conveyor, and impingement air nozzles direct air onto the conveyor from a range of 240 meters per minute to 1,200 meters per minute.

23. The apparatus of claim 9, wherein the environmental air around the at least one cooled roller has a dew point above the temperature of the at least one cooled roller and the at least one cooled roller has a temperature of from 5° F. to below 32° F.

24. The apparatus of claim 9, wherein the extruded slab has a thickness of from 0.15 cm to 3 cm.

25. The apparatus of claim 13, wherein impingement air nozzles direct air onto the conveyor from a range of 240 meters per minute to 1,200 meters per minute.

26. The system of claim 18, wherein the environmental air around the at least one cooled roller has a dew point above the temperature of the at least one cooled roller and the at least one cooled roller has a temperature of from 5° F. to below 32° F.

27. The system of claim 18, wherein the extruded slab has a thickness of from 0.15 cm to 3 cm.

28. The system of claim 19, wherein the cooled conveying system receiving the chewing gum slab from the extruder has impingement air nozzles direct air onto the conveyor from a range of 240 meters per minute to 1,200 meters per minute.

* * * * *